Patented May 28, 1940

2,202,148

UNITED STATES PATENT OFFICE 2,202,148

COMBINED INSECTICIDE AND LARVICIDE

Joseph M. Ginsburg, New Brunswick, N. J., assignor to Endowment Foundation, New Brunswick, N. J., a corporation of New Jersey No Drawing. Application June 21, 1939,
Serial No. 280,306

17 Claims. (Cl. 167—24)

This invention relates to a greatly improved mosquito larvicide and insecticide.

Throughout a period of several years, I have developed insecticides and larvicides for killing mosquitoes, their larvae and pupae. In my study of this subject I have found that while pyrethrin, which is the toxic element in pyrethrum, has been used as an insecticide for many years, it is most effective for use in a mosquito larvicide. In my early work, I used a preparation of kerosene extract of pyrethrum, with soap as an emulsifier. In this preparation the pyrethrin remains in the oil film and is therefore insoluble in water, and when such a preparation is sprayed over a surface of water, the oil film, with the pyrethrin, rises quickly to the surface and kills the mosquito, larvae and pupae, and does not injure the fish, water-fowl or plants.

One trouble with this early larvicide was that it was not satisfactory for use in salt water. To overcome this objection, I used a new emulsifying agent which made the larvicide compatible with fresh water, whether it was hard or soft, as well as salt or sea water. This was a decided step in advance because the concentrate larvicide could be mixed with any water available at the place desired to be treated, and then applied to the area desired to be covered. This new chemical emulsifying agent which I have found very suitable for the purpose is one taken from a group consisting of the alkaline metal salts of sulphated higher alcohols, sulphated aliphatic compounds, and sulphated aromatic compounds. One of these emulsifiers that I have found very satisfactory, is sodium lauryl sulphate, and a very satisfactory formula for a larvicide using this emulsion is:

|   | Present-day cost |
|---|---|
| 6 gal. kerosene | $ .48 |
| 6 lbs. pyrethrum extract | 1.80 |
| (Analyzing 0.9% pyrethrin) or approximately a total of 24 grams of pyrethrin. | |
| 3 gal. water | 0.00 |
| 8 oz. (approximately) of emulsifier | .13 |
| Total cost of ingredients for 9 gal. of larvicide | 2.41 |
| Approximate cost of 1 gal. concentrate larvicide | .27 |

From the above it is seen that 75% of the cost of the larvicide is in the pyrethrum item.

It is therefore the principal object of my present invention to provide means for accelerating or increasing the effectiveness or toxicity of pyrethrin so that the amount to be used in the larvicide may be reduced, thereby reducing the cost of the concentrate larvicide and increasing its field of usefulness, without in any way reducing its effectiveness.

After much study, many laboratory experiments and field tests, I have discovered a new and improved larvicide and insecticide. I have found that by incorporating in the kerosene, with the pyrethrum extract, small quantities of a compound taken from the class of thio-diaryl amines, such as for example, thio-diphenylamine, the insecticidal power of my larvicide is so greatly increased that instead of using the extract of one pound of pyrethrum per one gallon of kerosene, as in my old formula, I can use the same quantity of extract of pyrethrum for three or four gallons of kerosene, with an equally high toxicity and effectiveness against mosquitoes, their larvae and pupae, thereby greatly reducing the cost of the larvicide as will be seen from the following figures:

|   | Present-day cost |
|---|---|
| 6 gal. kerosene | $ .48 |
| 2 lbs. pyrethrum extract | .60 |
| (Analyzing 0.9% pyrethrin) or approximately a total of 8 grams of pyrethrin. | |
| 3 gal. water | 0.00 |
| 8 oz. (approximately) of emulsifier | .13 |
| 20 grams thio-diphenylamine | .03 |
| Total cost of ingredients for 9 gal. of larvicide | 1.24 |
| Approximate cost of 1 gal. concentrate larvicide as compared with 27¢ with my old formula. | 13¾¢ |

Thio-diphenylamine, when pure, is a yellowish crystalline compound of chemical formula $C_6H_4NHC_6H_4S$. It may be prepared by heating sulfur with diphenylamine in the presence of iodine as a catalyst. Thio-diphenylamine is only very slightly soluble in kerosene and similar petroleum distillates. I have found, however, that by heating the kerosene to 80° C.–90° C., the solubility of thio-diphenylamine is somewhat increased so that about .05%–.08% can be incorporated. At this concentration the kerosene becomes saturated with thio-diphenylamine. I have found that when I extract pyrethrum with this saturated kerosene solution, the resultant extract becomes three to four times as potent to insects, as the ordinary kerosene extract used in my old larvicide formula. The combination of the two ingredients, pyrethrin and thio-diphenylamine, exerts a combined or synergistic action, one increasing the toxic effect of the other, particularly against mosquitoes. For example, I have found by experiments and tests that neither a concentration of pyrethrin in the proportion as set forth in the formula of my new larvicide, nor the small amount of the thio-diphenylamine which can be dissolved in kerosene, is sufficient of itself to render a complete killing effect on mosquitoes, their larvae or pupae, whereas when the two are combined, the action is as heretofore described.

Thio-diphenylamine applied in concentration sufficiently strong, by itself, to kill mosquitoes and other insects, if brought into contact with the human skin, will cause dermatitis, but I have found that the low concentration which is ample to activate pyrethrins, as previously described, is not sufficient to cause injury to the human skin, animals or plants.

In order to incorporate pyrethrum or its extract with a thio-diarylamine compound, such as thio-diphenylamine, in my improved larvicide, I may employ any one of the following methods:

I may saturate kerosene with thio-diphenylamine and use the thus treated kerosene for extracting the pyrethrin; or I may first mix the required quantities of pyrethrum and thio-diphenylamine dry, and then extract the mixture with kerosene at about 80° C.–90° C.; or I may add the required quantity of concentrated pyrethrum extract to kerosene previously saturated with thio-diphenylamine; or I may first prepare a concentrated solution of thio-diphenylamine in any suitable kerosene-miscible solvent, such, as for example, ethylene di-chloride, acetone, carbon-tetrachloride or the equivalent, and add this solution to the kerosene containing the pyrethrin, in the quantities required for my larvicide, during the emulsification step; or I may take a concentrate extract of pyrethrum, a concentrate solution of thio-diphenylamine, and mix the two together in the necessary proportions, and store this as a stock solution. The necessary amount of this stock solution may be added to the kerosene either prior to or during the emulsification. The kerosene or other satisfactory petroleum distillate, treated by one of the above-enumerated methods, or similar methods, has proven satisfactory in preparing my improved larvicide.

While I prefer to use thio-diphenylamine in my present formula, I may use other members of the thio-diarylamine class, such as, for example:

Thio-phenyl naphthylamine.
Thio-ditoluene amine.
Thio-diphenyl ethane amine.
Thio-diphenyl-diamino amine.

and others. My experiments with a substantial number of thio-diaryl-amine compounds and their derivatives, leads me to believe that all, or at least a majority, of the members of this group, will perform as herein described when combined with pyrethrin. Also, while I prefer to use kerosene in my present formula, I may employ other suitable petroleum oils, such as fuel oil, light lubricating oil, or the equivalent.

It is to be understood that the above description and examples are by way of illustration and not of limitation, as the proportion of the ingredients may be varied and other solvents used than those mentioned for extracting the pyrethrin, or the pyrethrum may be used in some cases as a finely ground powder.

In general, it may be said that one way of preparing the larvicide is to dissolve the emulsifier in water in a tank provided with agitators and a pump. As soon as foaming starts, the oil-pyrethrin thio-diphenylamine mixture is slowly added with the pump and agitators running at full speed. After all of the oil has been added, the pumping is continued for fifteen to thirty minutes or until the entire mixture is passed through the hose and back into the tank at least three times. The mixture is then pumped out into drums for storage and future use, thereby making up the concentrate stock larvicide. When using this concentrated mixture, it is mixed with approximately ten parts of water and sprayed on the mosquito breeding area, or may be sprayed around the foliage or over the lawn or in the vicinity of grand-stands where outdoor gatherings are being held. The water for mixing can be taken directly from the breeding place regardless of the amount of salt it may contain, as the emulsifier which I prefer to use is compatible with fresh, or salt water. The larvicide made according to my present invention may be stored for a long time without decomposition and, as has been pointed out, is in no way affected by salt water of high salinity, and may be effectively applied to all kinds of mosquito breeding waters with complete killing of larvae and pupae.

Since the larvicide herein described is prepared in concentrated form, an amount sufficient to cover a considerable area may be carried out into salt marsh areas and mixed with the water there available. This larvicide quickly separates out from the water and rises to the surface, forming a thin layer of concentrated toxic chemicals on the water, which gives a rapid and complete kill to the larvae and pupae. This constitutes a distinct and valuable advantage over other mosquito larvicides which completely mix with water, thus requiring large quantities of basic materials to produce satisfactory killing, especially in waters of considerable depth. Due to this valuable characteristic of the larvicide to quickly rise to the surface, large areas of salt water may be treated with the larvicide, at much lower costs than with the water-miscible or water-soluble larvicides, and due to the greatly diminished cost of production of my new larvicide without decreasing its effectiveness, a tremendous saving in money results.

What I claim is:

1. An insecticide and mosquito larvicide including an oil derived from petroleum, an extract of pyrethrum, and a compound in small amount taken from the class of thio-diaryl-amines, but having synergistic action with the extract of pyrethrum, water and an emulsifier.

2. An insecticide and mosquito larvicide including an oil derived from petroleum, pyrethrin, thio-diphenylamine in small amount as herein set forth and an emulsifier.

3. An insecticide and mosquito larvicide including an oil derived from petroleum, an extract of pyrethrum, and a compound in small amount taken from the class of thio-diaryl-amines but having synergistic action with the extract of pyrethrum, water and an emulsifier taken from a group consisting of alkali metal salts of sulphated higher alcohols, sulphated aliphatic compounds and sulphated aromatic compounds capable of rendering the larvicide compatible with fresh and hard water, salt and/or sea water.

4. An insecticide and mosquito larvicide including water, pyrethrin, and a compound in small amount taken from the class of thio-diaryl-amines but having synergistic action with pyrethrin dissolved in petroleum oil, and an emulsifier.

5. An insecticide and mosquito larvicide including water, pyrethrin, thio-diphenylamine in small amount as herein set forth, dissolved in petroleum oil, and an emulsifier.

6. An insecticide and mosquito larvicide including water, pyrethrin, thio-diphenylamine in small amount as herein set forth dissolved in kerosene and an emulsifier taken from a group consisting of alkali metal salts of sulphated higher alcohols, sulphated aliphatic compounds and sulphated aromatic compounds capable of rendering the larvicide compatible with fresh and hard water, salt and/or sea water.

7. In a mosquito emulsion-type larvicide containing an oil derived from petroleum, an extract of pyrethrum, water and an emulsifier, means for increasing the effectiveness of said extract, said means being a compound in small amount taken from the class of thio-diaryl-amines and included in the emulsion.

8. In a mosquito emulsion-type larvicide containing an oil derived from petroleum, an extract of pyrethrum, water and an emulsifier, means for increasing the effectiveness of said extract, said means being thio-diphenylamine in small amount as herein set forth dissolved in the oil and included in the emulsion.

9. The method of preparing an improved concentrate insecticide and mosquito larvicide which consists in dissolving a compound in small amount taken from the class of thio-diaryl-amines but being capable of having a synergistic action with pyrethrum in an oil derived from petroleum, then treating pyrethrum with this solution to derive an extract of pyrethrin therefrom, then adding water and an emulsifier, and emulsifying the whole.

10. The method of preparing an improved concentrate insecticide and mosquito larvicide which consists in dissolving thio-diphenylamine in kerosene, then making an extract of pyrethrum with this solution, adding water and an emulsifier taken from a group consisting of alkali metal salts of sulphated higher alcohols, sulphated aliphatic compounds and sulphated aromatic compounds, and emulsifying the whole.

11. The method of preparing an improved concentrate insecticide and larvicide which consists in making an emulsion of kerosene, pyrethrin, and a compound in small amount taken from the class of thio-diaryl-amines but having synergistic action with pyrethrin, water and an emulsifier in the proportion as herein set forth.

12. The method of preparing an improved concentrate insecticide and larvicide which consists in making an extract from pyrethrum with a petroleum oil mixing this extract with a compound in small amount taken from the class of thio-diaryl-amines but having synergistic action with the extract of pyrethrum, adding water and an emulsifier as specified, and then emulsifying the whole.

13. The method of preparing an improved concentrate insecticide and larvicide which consists in making a concentrated extract of pyrethrum, also making a saturated solution of kerosene and thio-diphenylamine in small amount as herein set forth, and then mixing the two with water and an emulsifier.

14. An improved insecticidal product comprising an extract of pyrethrum made with a petroleum oil distillate and a compound in small amount taken from the class of thio-diphenylamine, thiophenyl naphthylamine, thio-ditoluene amine, thio-diphenyl ethane amine and thio-diphenyl-diamino amine.

15. An improved insecticidal product comprising an extract of pyrethrum made with a saturated solution of kerosene and thio-diphenylamine.

16. An insecticide comprising pyrethrin, an oil derived from petroleum and a compound in a small amount taken from the class of thio-diaryl-amines but having synergistic action with the pyrethrin.

17. An insecticide comprising pyrethrin, an oil derived from petroleum and thio-diphenyl-amine in small amount as herein set forth.

JOSEPH M. GINSBURG.